United States Patent [19]

Förster et al.

[11] Patent Number: 5,477,949
[45] Date of Patent: Dec. 26, 1995

[54] SHOCK ABSORBER

[75] Inventors: Andreas Förster, Schweinfurt; Hubert Beck, Eitorf-Keuenhof, both of Germany

[73] Assignee: Fichtel & Sachs AG, Schweinfurt, Germany

[21] Appl. No.: 221,367

[22] Filed: Mar. 31, 1994

[30] Foreign Application Priority Data

Apr. 3, 1993 [DE] Germany .......................... 43 11 100.9
Apr. 3, 1993 [DE] Germany .......................... 43 11 101.7

[51] Int. Cl.$^6$ .................................................. F16F 9/36
[52] U.S. Cl. ................................ 188/322.17; 188/322.5; 188/315
[58] Field of Search ................................ 188/314, 315, 188/322.16, 322.17, 322.5, 299, 311, 312

[56] References Cited

U.S. PATENT DOCUMENTS

| | | | |
|---|---|---|---|
| 4,482,036 | 11/1984 | Wossner et al. | 188/322.17 |
| 4,724,938 | 2/1988 | Horvath | 188/382 |
| 4,955,460 | 9/1990 | Lizell et al. | 188/315 |
| 4,989,701 | 2/1991 | Yamaoka et al. | 188/322.17 |
| 5,163,538 | 11/1992 | Derr et al. | 188/299 X |
| 5,211,268 | 5/1993 | Lizell et al. | 188/281 |
| 5,224,573 | 7/1993 | Amemiya et al. | 188/322.17 |

FOREIGN PATENT DOCUMENTS

| | | |
|---|---|---|
| 0535409 | 4/1993 | European Pat. Off. . |
| 0771899 | 4/1957 | Germany . |
| 1146705 | 4/1963 | Germany . |
| 1803665 | 8/1969 | Germany . |
| 3020749 | 12/1981 | Germany . |
| 3040652 | 5/1982 | Germany . |
| 3117493 | 11/1982 | Germany . |
| 8222698 | 12/1982 | Germany . |
| 3833891 | 5/1989 | Germany . |
| 3800288 | 6/1989 | Germany . |
| 4005513 | 9/1990 | Germany . |
| 3922043 | 9/1990 | Germany . |
| 4030788 | 5/1991 | Germany . |
| 4139377 | 6/1993 | Germany . |
| 0576025 | 3/1946 | United Kingdom . |
| 0775195 | 5/1957 | United Kingdom . |
| 1414810 | 11/1975 | United Kingdom . |
| 2002492 | 2/1979 | United Kingdom . |
| 1590608 | 6/1981 | United Kingdom . |
| 2104186 | 3/1983 | United Kingdom . |
| 2116666 | 9/1983 | United Kingdom . |
| 2115903 | 9/1983 | United Kingdom | 188/322.17 |
| 2237356 | 5/1991 | United Kingdom . |
| 2243898 | 11/1991 | United Kingdom . |
| 2265436 | 9/1993 | United Kingdom . |

*Primary Examiner*—Mark T. Le
*Assistant Examiner*—Peter M. Poon
*Attorney, Agent, or Firm*—Nils H. Ljungman & Associates

[57] ABSTRACT

A piston rod guide is provided for a shock absorber assembly, wherein the piston rod guide has a reflux passage for returning damping fluid back to the annular space formed between the cylinder walls of the shock absorber. The reflux passage is configured in a manner such that the returning damping fluid is returned to the annular space in a manner which substantially reduces foaming of the damping fluid within the cylinders.

20 Claims, 4 Drawing Sheets

SHOCK ABSORBER

BACKGROUND OF THE INVENTION

1. Field of the Invention

This invention generally relates to a shock absorber having a piston rod which is guided therein by a one-piece sheet metal piston rod guide. Such a shock absorber can possibly have, among other things, a sealed cylindrical tube, which can be an outer tube thereof, and an inner, concentrically disposed pressure tube that can preferably be filled with damping medium. The space between the sealed cylindrical tube and the pressure tube can typically form an equalization chamber, and a piston rod gasket can close the shock absorber from the atmosphere. The sheet metal guide can typically comprise a graduated, circular, pot-shaped base body with a concentric guide surface for a bearing bush, a contact surface for the piston rod gasket and a guide surface in relation to the sealed cylindrical tube. There can also be at least one reflux opening for passage of damping fluid therethrough from an area above the guide back into the equalization chamber.

2. Background Information

In a general type of piston-cylinder arrangement, such as a shock absorber, damping medium, which can be oil, can leak between the piston rod and the guide. Also, on the other hand, gas can repeatedly collect in the pressure tube. The leaking damping medium and the collected gas are typically discharged back into the equalization chamber by means of the piston rod guide complex. This discharge back into the equalization chamber prevents the piston rod gasket from being pressurized by the high damping pressure, or from causing malfunctions and rattling noises as a result of the presence of gas in the high-pressure portion.

On shock absorbers of this type which are subjected to severe stresses, it is also conventional to gas-pressurize the shock absorber, to improve their functioning. This gas pressure promotes the gravity actuation of the shock absorber and suppresses the tendency to foaming. So that the gas does not escape into the atmosphere via the piston rod gasket, such a shock absorber can also contain a gas lock. The gas lock is, in practical terms, a smooth-running rubber hose valve, which provides that the piston rod gasket is fully immersed in the damping medium (oil), and that when the shock absorber is stationary, the gas no longer has any access to this space, from which it could escape to the outside via the piston rod surface. By using high-quality, but also expensive, gasket materials, it even becomes possible to eliminate the gas lock altogether in some cases. Generally, the piston rod guides have been made from a rigid suspension part, which is usually manufactured of sintered metal or similar moldable materials (die cast aluminum, die cast zinc).

One problem with the manufacture of these parts by sintering or molding, is always the deformability of the complicated reflux openings, i.e. undesirable burrs are formed during the manufacturing process. If these burrs are machined out, then undesirable particles of dirt can get into the damping medium, which in turn has an adverse effect on the function of the damping valves. Deburring, e.g. by means of spot sandblasting, makes the already expensive part even more expensive.

The disadvantages which result from the use of sintered material for a piston rod guide can be reduced by using a sheet metal piston rod guide. German Laid Open Patent Application DE-OS 40 30 788, for example, discloses a one-piece sheet metal piston rod guide, but the piston rod guide described therein also has several disadvantages.

One primary point of criticism for this known guide assembly, is the large amount of space occupied in the axial direction of the shock absorber. Thus, because of the excess axial length, the useful stroke length of the shock absorber is significantly reduced, and if a decompression stop pad is also used, the axial stroke length can be even further reduced.

An additional disadvantage is that, as a result of the orientation of the piston rod gasket in relation to the piston rod guide, an axial misalignment can occur, so that the piston rod seal does not perform a uniform sealing function.

Also, the danger of foaming in the equalization chamber is increased by the disadvantageous positioning of the reflux openings, which positioning allows the damping medium to fall unobstructed into the equalization chamber. Further, the known arrangement of DE-OS 40 30 788 also does not provide any measures which exert a prestress on the shock absorber to prevent the above-mentioned internal leaks.

OBJECT OF THE INVENTION

The object of the present invention is to realize a sheet metal piston rod guide which minimizes and even preferably eliminates the disadvantages described above and which can also be manufactured more easily.

SUMMARY OF THE INVENTION

The invention teaches that this object can be accomplished by a piston rod guide configuration wherein an outside diameter of the piston rod guide, and the inside diameter of the sealed cylindrical outer tube of the shock absorber, form radial, narrow smoothing passages to the equalization chamber, which passages extend from the reflux openings in the piston rod guide. This configuration takes advantage of the cohesive forces between the damping medium and the walls of the cylinder to allow the damping medium to run down along the walls of the sealed cylindrical tubes of the shock absorber.

The smoothing passages allow the damping medium to flow slowly downward from the pot-like piston rod guide along the cylindrical walls. This advantageous measure can prevent uncontrolled return of damping medium back into the equalization chamber, thus substantially reducing undesirable foaming. The small radial size of the smoothing passages can even make it possible to eliminate a check valve from the guide assembly. Such check valves, in the form of a thrust collar, or torsionally twisted piston ring, are used by known assemblies. This elimination of a check valve can essentially be possible since the gas blanket cannot penetrate through such narrow smoothing passages and then through the damping medium sump, formed by the piston rod guide in the graduated portion of the piston rod guide, into the pressure tube.

An additional advantageous feature of the invention is that the guide surface of the piston rod guide, in relation to the sealed cylindrical outer tube, can have segment-like guide sections, between which the smoothing passages are formed. Thus, there can be a very rigid piston rod guidance in relation to the sealed cylindrical tube. The molding of the smoothing passages can be done very easily in this guide surface.

Also, the end of the shock absorber containing the piston rod guide can be sealed from the atmosphere by means of a piston rod gasket. Thus, in order that the smoothing passages have the greatest active length possible, the reflux openings can preferably be located immediately underneath the piston rod gasket.

To reduce the effort and expense required for shaping during the manufacture of the piston rod guide, in contrast to the prior art, the surface on the piston rod guide which contacts the gasket can preferably be formed by the cross section surface of the guide. In other words, the thickness dimension of the end surface can form the contact surface.

The gasket thereby also has a contact surface contacting the piston rod guide, and, so that the reflux openings can preferably always lie higher than the damping medium sump, the reflux passages can alternatively be formed by notches in piston rod guide in the vicinity of the contact surfaces between the piston rod gasket and guide.

Also, to take optimum advantage of the length of the smoothing passages, and on the other hand to make the damping medium sump as low as possible, the reflux openings can also preferably be oriented essentially horizontally.

For the execution of an elastic movement inside the shock absorber, the distance between the contact surface for the piston rod gasket and the contact surface for the pressure tube can preferably be greater than the distance between the graduation and the base of the piston rod guide and the contact surface for the pressure tube. If, during assembly, the shock absorber is prestressed by the piston rod gasket, the piston rod guide can be elastically deformed over the length between the contact surfaces for the piston rod gasket and the pressure tube, wherein the central portion of the guide can be pressed upwardly by the inner cylinder. Thus, the guide can exert a spring function, acting to press the pressure tube into the outer cylinder tube and thereby maintain a tight engagement between the piston rod guide and the top of the pressure tube.

According to an additional advantageous characteristic, at least the side of the reflux openings facing the piston rod can be impressed into the guide on the contact surface for the piston rod gasket, so that over a portion of the length of the reflux openings, the reflux openings can be formed by the underside of the piston rod gasket and the impressions, or embossings, into the contact surface of the piston rod guide.

As a result of the embossings, in practical terms, the diameter of the reflux openings and an additional surrounding area of axial space can be maintained without the necessity of having to make a larger piston rod guide element. At the same time, the reflux openings can preferably be in a favorable position in relation to the piston rod guide, so that a reliable blocking action of the oil sump formed by the base body is guaranteed, in connection with a relatively small quantity of oil compared to known devices.

The piston rod guide can also be provided with a centering surface for the piston rod gasket, whereby the centering surface can be a component of the graduations of the piston rod guide. By means of this advantageous measure, the problem of axial misalignment can essentially be effectively eliminated, so that a uniform sealing function of the piston rod gasket is guaranteed.

To keep the manufacturing costs for the piston rod guide low, the guide surface for a bearing for the piston rod, and the bearing bush can form a transition fit, and the bearing bush can be axially fixed in place by numerous hammered bends, with the piston rod guide between the axial contact surfaces. The quality of the fit can be relatively approximate. During assembly of the bearing bush, the hammer bending of the piston rod guide can essentially be performed in a single work step.

For a better utilization of space, the flange and the pressure tube can define an annular space in which there can be a decompression stop pad for engaging a stop of the piston rod.

As an additional measure to counteract foaming in the shock absorber, a guide surface for the bearing bush can advantageously form at least one ventilation passage, which ventilation passage can be in communication with outlet notches which empty into a thrust collar chamber defined by a ventilation thrust collar.

The ventilation passage can be formed in a simple manner by a conical configuration of the guide surface, which conical configuration can simultaneously serve as an aid to assembly, since the piston rod guide can be self-centering on the cone.

As a result of the particular configuration of the piston rod guide provided by the present invention, the tool wear of the shaping tool can also be significantly reduced.

In summary, one aspect of the invention resides broadly in a shock absorber, the shock absorber having a longitudinal dimension, the shock absorber comprising: a first tubular member, the first tubular member having a first end and a second end; a second tubular member disposed within the first tubular member, the second tubular member having a first end disposed adjacent the first end of the first tubular member, and the second tubular member comprising a chamber therewithin; the first tubular member and the second tubular member defining an annular space therebetween, the first tubular member and the second tubular member each having a wall disposed towards the annular space; piston apparatus disposed within the second tubular member, the piston apparatus dividing the chamber of the second tubular member into a first chamber portion and a second chamber portion; a piston rod device disposed through the first end of each of the first and second tubular members, the piston rod device being movable axially within the second tubular member in a direction along the longitudinal dimension of the shock absorber; the piston rod device being connected to the piston apparatus for movement of the piston apparatus along with the piston rod device; damping fluid disposed within the second tubular member and the annular space; the annular space further comprising a gas space having a gas therein; the first end of the first and second tubular members comprising guide apparatus for guiding the piston rod device during the axial movement of the piston rod device; the guide apparatus comprising a device for partially closing the first end of the second tubular member, the device for partially closing defining a space adjacent the first end of the second tubular member, and the device for partially closing comprising a guide surface disposed about the piston rod device; the guide device comprises a passage for conveying damping fluid from the space adjacent the first end of the second tubular member to the annular space between the first and second tubular members; and the passage being disposed to comprise apparatus for conveying a substantial portion of the damping fluid passing through the passage means, from the space adjacent the first end of the second tubular member, and along the wall of at least one of the first and second tubular members.

Another aspect of the invention resides broadly in a method utilizing the above-described apparatus, wherein the method comprises the steps of: providing the first tubular member; providing the second tubular member within the first tubular member to form the annular space between the first tubular member and the second tubular member; providing piston means and piston rod means within the second tubular member with the piston rod device extending out of the first end of the second tubular member; providing damping fluid within the second tubular member and annular space; placing the piston rod guide apparatus adjacent the first end of the first and second tubular members with the guide surface disposed about the piston rod device; at least partially closing the first end of the second tubular member with the device for partially closing; operating the shock absorber by moving the piston rod within the guide surface of the device for partially closing; conveying damping fluid through the device for partially closing, along the guide surface during the moving of the piston rod within the guide surface; providing the passage for conveying the damping fluid back to the annular space; conveying the damping fluid passing through the device for partially closing, along the passage to the wall of one of the first and second tubular members; conveying a substantial portion of the damping fluid from the passage along the wall of at least one of the first and second tubular members; and substantially preventing foaming of the damping fluid within the annular space by the conveying of the substantial portion of the damping fluid along the at least one wall of the first and second tubular members.

Still another aspect of the invention resides broadly in a shock absorber, the shock absorber having a longitudinal dimension, the shock absorber comprising: a first tubular member, the first tubular member having a first end and a second end; a second tubular member disposed within the first tubular member, the second tubular member having a first end disposed adjacent the first end of the first tubular member, and the second tubular member comprising a chamber therewithin; the first tubular member and the second tubular member defining an annular space therebetween, the first tubular member and the second tubular member each having a wall disposed towards the annular space; piston apparatus disposed within the second tubular member, the piston apparatus dividing the chamber of the second tubular member into a first chamber portion and a second chamber portion; a piston rod device disposed through the first end of each of the first and second tubular members, the piston rod device being movable axially within the second tubular member in a direction along the longitudinal dimension of the shock absorber; the piston rod device being connected to the piston apparatus for movement of the piston apparatus along with the piston rod device; damping fluid disposed within the second tubular member and the annular space; the annular space further comprising a gas space having a gas therein; and the first end of the first and second tubular members comprising guide apparatus for guiding the piston rod device during the axial movement of the piston rod device. The guide apparatus comprises: a device for partially closing the first end of the second tubular member; a gasket member for sealing the first end of the first tubular member from the environment, the device for partially closing defining a space between the gasket member and the first end of the second tubular member, and the device for partially closing comprising a guide surface disposed about the piston rod device for guiding movement of the piston rod therein; and a passage for conveying damping fluid from the space between the gasket member and the first end of the second tubular member, to the annular space between the first and second tubular members; the device for partially closing and the gasket member each comprising a substantial surface in contact with a substantial surface of the other of the device for partially closing and the gasket member; the passage comprises a first passage portion having a length disposed substantially radially to the piston rod device; and at least a substantial portion of the length of the first passage portion comprising a radially disposed impression into one of: the contact surface of the gasket member; and the contact surface of the device for partially closing, to form the at least a substantial portion of the length of the first passage portion between the contacting surfaces of the gasket member and the device for partially closing.

BRIEF DESCRIPTION OF THE DRAWINGS

The invention is explained below in greater detail with reference to the accompanying figures, in which.

DESCRIPTION OF THE PREFERRED EMBODIMENT

Figure 1:
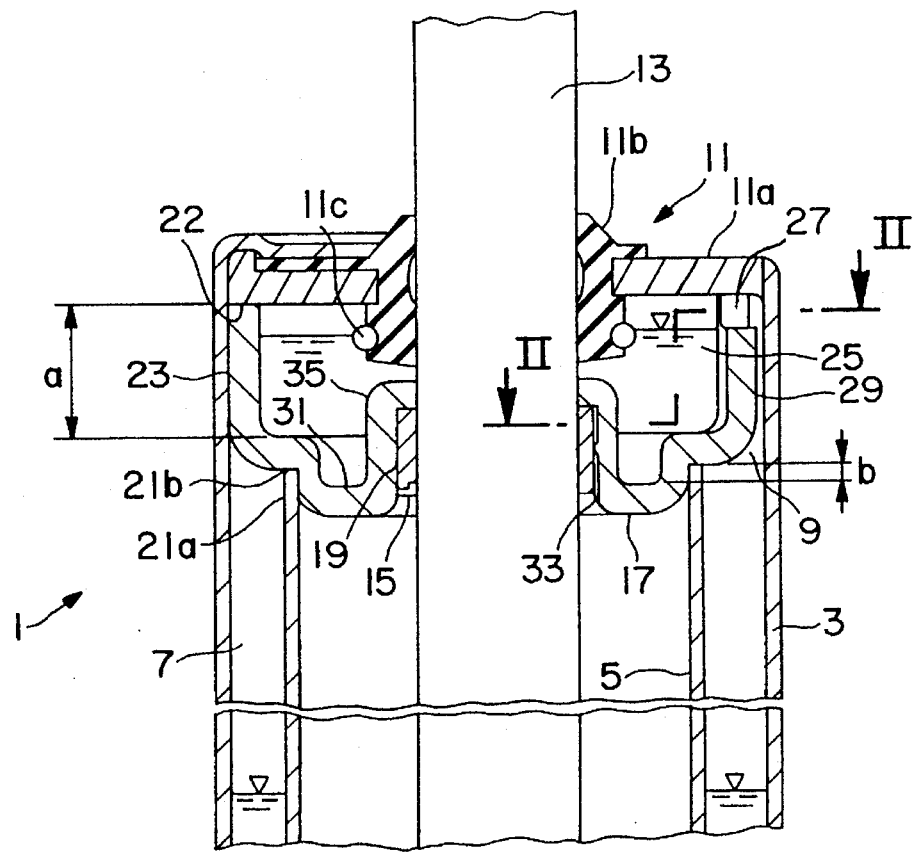
FIG. 1 is a more detailed section through a shock absorber in the vicinity of a piston rod guide.
Figure 1A:
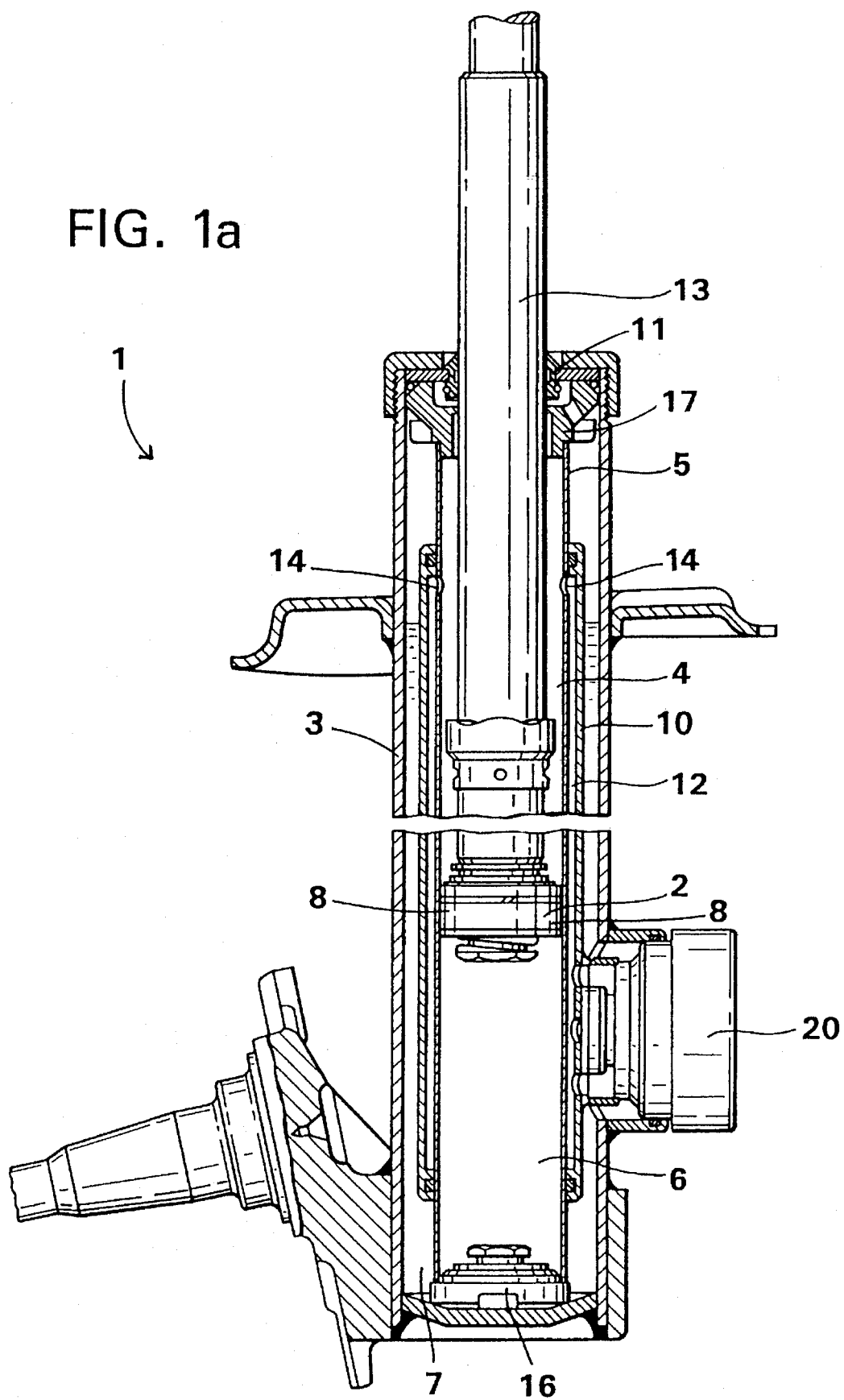
FIG. 1a is a longitudinal section through a shock absorber.

FIG. 1a shows an example of what could be considered to be a typical shock absorber 1. Such a shock absorber 1 could be considered to be an adjustable, two-tube shock absorber, and could typically have an external cylinder 3 and an internal cylinder 5. The internal cylinder 5, or pressure cylinder, can generally contain a hydraulic fluid and can have a damping piston 2 sealingly disposed within the cylinder to divide the space within the cylinder 5 into two working chambers 4 and 6. The damping piston 2 can preferably be attached to a piston rod 13, which piston rod 13 can sealingly project into cylinder 5 through a gasket 11 and guide 17 arrangement, discussed in more detail herebelow. By means of such a gasket and guide arrangement, the piston rod 13 can preferably be axially displaceable with respect to the cylinder 5.

The end of the piston rod 13, which projects out of the cylinder 5, can preferably be attached to a structure portion, for example, of a motor vehicle, which is not shown. Similarly, the external cylinder 3 could also have an attachment arrangement for attaching the cylinder 3 to another structural portion of a motor vehicle, thereby providing a damping action between the two portions to which the shock absorber is attached.

The piston 2 could also be provided with axially throughgoing passages and associated valves 8 of conventional design and well known in the art, which can provide a substantially constant and non-variable resistance to the axial displacement of piston 2 and piston rod 13 within the cylinder 5.

An additional cylinder 10 could also be disposed about the cylinder 5, between the cylinder 5 and the cylinder 3. This cylinder 10 can define an annular bypass chamber 12 between the cylinder 5 and the cylinder 4, and can define an annular pressure equalization chamber 7 between the external cylinder 3 and cylinder 4. Bypass chamber 6 can preferably interconnect with the working chambers 4 and 6 via orifices 14, and valve 16 located at the bottom of cylinder 5. The bypass chamber 12 can thereby provide a means by which the damping medium contained therein can reach equalization chamber 7. Other possible configurations of shock absorbers could possibly omit the cylinder 4, and thereby have only the pressure equalization chamber disposed about the cylinder 5, between the cylinder 5 and the cylinder 3.

In addition to the above components, the shock absorber 1 may also have a damping force control unit 20, which can act hydraulically in parallel with throttle valves 8 to modify the substantially constant damping force which throttle valves 8 can provide. This force control unit 20 can be in fluid connection with bypass chamber 12 and equalization chamber 7.

The illustration in FIG. 1 is restricted to the piston rod exit side end of the shock absorber 1. In this illustration, one can see in better detail, the pressure tube 5 located inside the sealed cylindrical tube 3. As shown, this pressure tube 5 can preferably be filled with a damping medium, wherein the pressure tube 5 together with the sealed cylindrical tube 3 forms the equalization chamber 7. This equalization chamber 7 can preferably be partly filled with a gas blanket 9. A piston rod gasket 11 closes the shock absorber 1 off from the atmosphere. Such a gasket could have a substantially rigid disc-shaped portion 11a with a substantially centrally disposed opening for the piston rod 13. Within the opening there could preferably be an elastomeric member 11b for sealing about the piston rod 13. The seal of this member 11b can be increased by providing a ring 11c disposed therearound to compress the member 11b towards the piston rod 13. To guide a piston rod 13, there can also preferably be a bearing bush 15 which can be pressed into the piston rod guide 17. The piston rod guide 17 can also serve to center the pressure tube 5 in relation to the sealed cylindrical tube 3.

The piston rod guide 17 can be configured as a graduated, circular, pot-like base body which is formed from a sheet metal blank. The base body can preferably comprise a series of circumferential guide surfaces. For example, the base body can form a first concentric guide surface 19 for the bearing bush 15. The base body can also provide radial and axial guide surfaces 21a/21b for the pressure tube 5. The terminal end surface of the piston rod guide 17 can also preferably provide a contact surface 22 for the piston rod gasket 11. In addition, the outside diameter of the piston rod guide 17 can form a guide surface 23 in relation to the sealed cylindrical tube 3.

The graduated contour of the piston rod guide 17, while providing a number of guide surfaces, can, in turn, form a damping medium sump 25, which would typically always contain damping medium. In an upright position of the shock absorber 1, such as the position illustrated in FIG. 1a, this sump 25 will generally be filled with damping medium up to reflux openings 27. So that the blocking action of the damping medium sump 25 is always as effective as possible, the reflux openings 27 should preferably be located very high, i.e. immediately underneath the piston rod gasket 11, as shown in FIG. 1.

Figure 2:
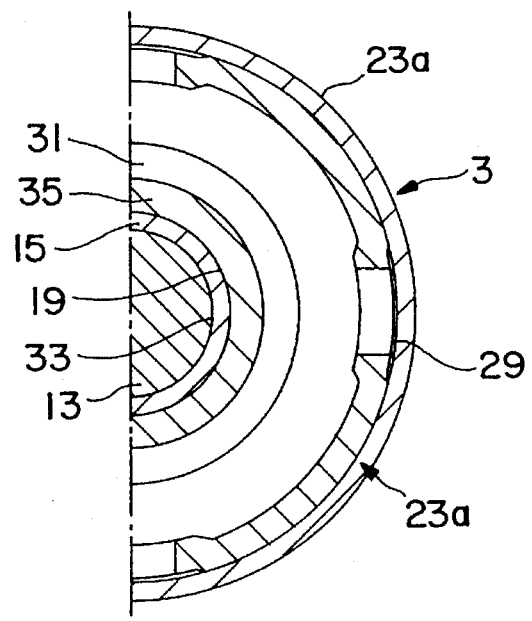
FIG. 2 is a cross section of a piston rod guide taken along line II—II of FIG. 1.

In the embodiment of the present invention as shown in FIG. 1, the reflux openings 27 can preferably be connected to smoothing passages 29 which empty into the equalization chamber 7, to thereby provide a return passage for damping medium which flows into the sump 25. In one embodiment, such as the embodiment of FIG. 1, the smoothing passages 29 can preferably be formed, in a non-cutting manner, into the guide surface 23, and thereby essentially divide the guide surface 23 into guide segments 23a, as shown in FIG. 2. The radial size of the smoothing passages 29 can preferably be deliberately kept small, to thereby increase the blocking action in relation to the gas blanket 9. In essence, because of the small size, the presence of damping medium flowing down through the passages 29 can preferably block gas from moving upwardly through the passages 29.

As an elastic equalization element to prevent internal leaks, a distance (a), of the upwardly extending flanges forming the surface 23, can preferably be configured so that the distance (a) can be significantly greater than a distance (b) between the guide surface 21b and the interior base 31 of the sump 25 of the piston rod guide 17. During assembly, a strong prestress can be applied to the ring having the height (a). After closing the end of the shock absorber, which can optionally be done by means of a welding or crimping process, the ring can act as a type of spring which applies a prestress to the pressure tube 5 inside the shock absorber 1, wherein the spring action presses the tube 5 downwardly towards the bottom of the shock absorber, and the spring action also maintains the guide 17 in tight engagement with the upper end of the tube 5.

During operation of the shock absorber, that is movement of the piston rod 13 within the tube 5, a controlled amount of damping medium can penetrate a gap 33 between the piston rod guide 17 and the bearing bush 15 in the vicinity of the guide surface 19 and the bearing bush 15, and can flow into the damping medium sump 25. Then when the height of the damping medium in the sump exceeds the lower edge of the openings 27, the damping medium excess can flow, via the reflux openings 27, into the smoothing passages 29, and into the equalization chamber 7.

In this embodiment of FIG. 1, the smoothing passages are disposed axially adjacent the interior wall of the cylinder 3. Thus, when the damping fluid flows through these passages 29, the damping fluid will be in contact with the interior wall of the cylinder 3, and because of the cohesive attraction between the damping fluid and the wall, the damping fluid will flow in a controlled manner down along the wall, through the gas cushion 9 and into the pool of damping fluid already present in the annular chamber 7. In this manner, a dripping of the fluid into the damping medium pool can substantially be avoided, and foaming, caused by such dripping, can be reduced.

Some factors which could possibly play a role in the cohesion between the damping fluid and the wall of the cylinder, as discussed above, could include the viscosity of the damping fluid and the surface tension of the damping fluid, as well as the operating temperature within the shock absorber. That is, an increase in temperature can result in a decrease in the viscosity of a damping fluid such as oil. The general phenomenon of such foaming is generally known to cause air bubbles to intermix with the damping fluid, whereby the air could then cause the damping fluid to apparently have a greater compressibility within the chambers of the pressure tube 5. This increased compressibility could ultimately cause the shock absorber to lose some of its damping ability. The present invention can therefore reduce such problems by reducing such foaming. In essence it would be preferable that substantially all of the fluid passing back into the annular space pass substantially solely along the wall of the outer tube to thereby minimize foaming.

The smoothing passages 29 can preferably be formed by the inside wall of the sealed cylindrical tube 3. Consequently, high cohesion forces act between the sealed cylindrical tube 3 and the damping medium, which essentially can ensure that the damping medium can preferably flow along the inside wall of cylinder 3 into the equalization chamber 7. As mentioned above, with the presence of damping medium in the passages 29, the gas blanket 9 cannot then penetrate into the damping medium sump 25. Thus, with the embodiment as shown in FIG. 1, there can essentially be no need for a check valve between the equalization chamber 7 and the damping medium sump 25.

The cardanic action known from the prior art can also be performed by this type of piston rod guide 17, since there is a relatively long lever arm available, formed essentially by a flange 35.

FIG. 2 shows a cross-sectional view taken through the upper portion of the shock absorber 1 in the vicinity of the guide 17. In the embodiment depicted by FIG. 2, the guide passages 28 are shown as passages pressed into the surface 23 of the piston rod guide 17. In one embodiment, there could possibly be four such passages 29 disposed at equally spaced intervals about the surface 23, while the number, and spacing of the passages 29 could vary depending on the shock absorber. As shown in FIG. 2, the size of the guide segments 23a, between the passages 29, can preferably be of a size which can provide high stability in the radial direction. Overall, the piston rod guide 17 can be manufactured with very little shaping effort and expense, which can make the guide 17 easy to produce.

In one preferred embodiment, it can be desirable that the depth of the passages 29 be about 1 mm, and the width be between about 1/9 th to about 1/11 th of the circumference of the guide surface 23.

Figure 3:
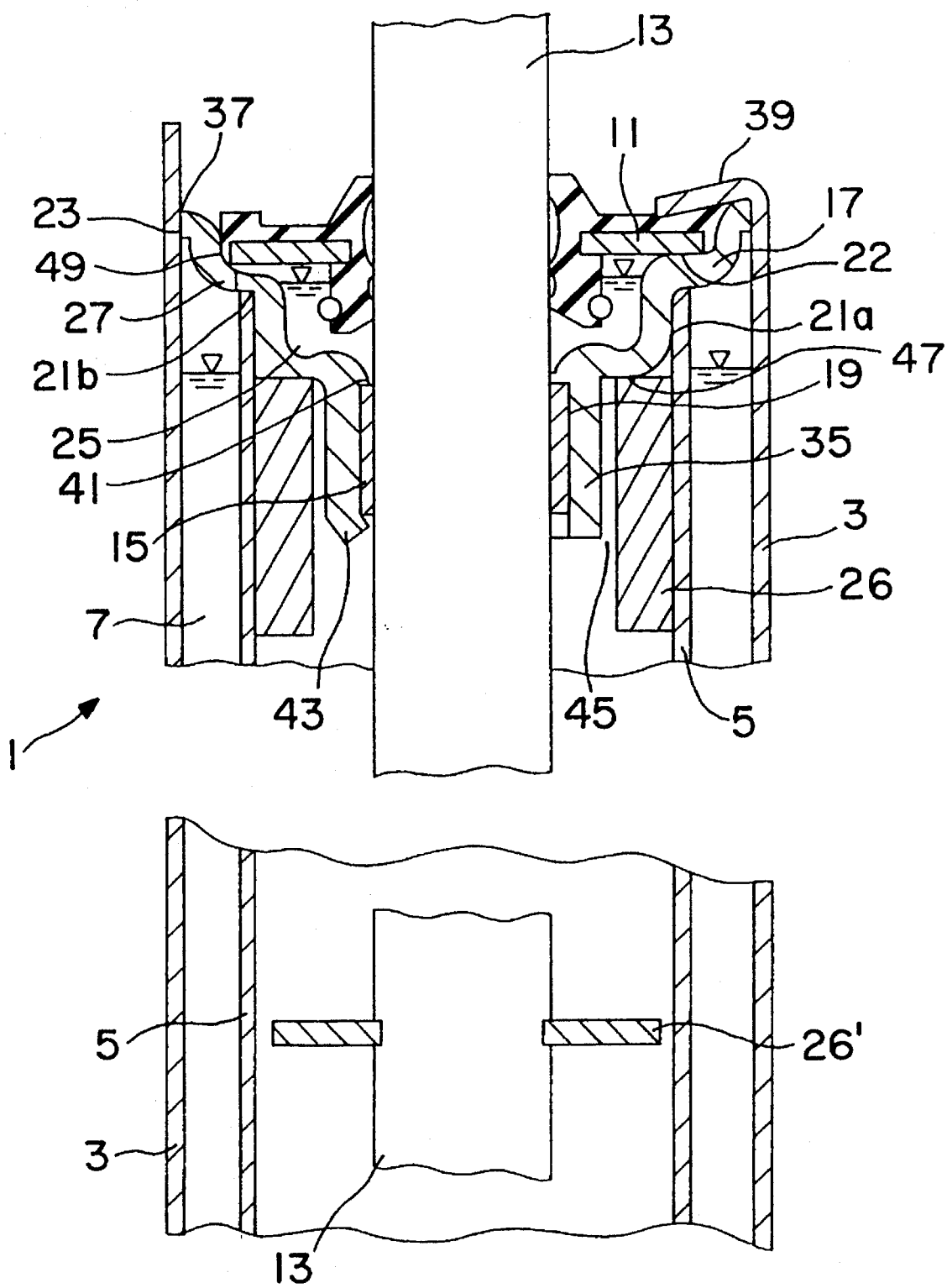
FIG. 3 illustrates a piston rod guide with a decompression stop pad.

FIG. 3 illustrates the piston rod exit side end of another embodiment of a shock absorber 1. Inside the sealed cylindrical tube 3, there can generally be a pressure tube 5, which can be centered by the piston rod guide 17 relative to the sealed cylindrical tube 3. The piston rod gasket 11 can seal the shock absorber 1, since the axially movable piston rod 13 can be guided by the bearing bush 15. As shown in FIG. 3, a shock absorber 1 could also have a decompression stop 26, which can interacts with a piston rod side stop 26'. Such a piston rod side stop 26' can essentially be a disc shaped member disposed about the piston rod 13, and can engage the stop 26 upon movement of the piston rod 13 out of the cylinder 5.

The piston rod guide 17 of this embodiment can preferably have a guide surface 23 which can fix the piston rod guide 17 radially in relation to the sealed cylindrical tube 3. A guide surface 21a can form an interference fit with the pressure tube 5 and thus positions the pressure tube 5 relative to the sealed cylindrical tube 3. In this embodiment, a flange 35 can form the concentric guide surface 19 for the bearing bush 15.

As discussed previously for the embodiment of FIG. 1, the piston rod guide 17, of FIG. 3 can also have a number of stop or contact surfaces. For example, an upper end of the guide 17 can form a contact surface 37 for over which the crimping 39 of the sealed cylindrical tube 3 can be bent. The distance between the surface 37 and the piston rod gasket 11 advantageously plays only a secondary role, since this distance can easily be compensated by the crimping process. The contact surface 21b can engage the end of the cylinder 5, and thereby fix the piston rod guide 17 in the axial direction inside the shock absorber 1.

For the bearing bush 15, the piston rod guide 17 can have a stop surface 41. The stop surface 41 can be either continuous about the surface 19, or can be formed in segments spaced apart about the surface 19. To axially secure the bearing bush 15, the piston rod guide 17, in the flange area, can be continuously bent by hammering in numerous places 43. Thus, the transition fit, or fit during assembly, between the bearing bush 15 and the flange 35 can be relatively approximate. The shock absorber, in the vicinity of the flange 35 can also preferably have a toroidal space 45 formed between the flange 35 and the pressure tube 5. This toroidal space 45 can preferably be bordered on the upper end by a decompression stop surface 47.

The guide 17 can also preferably be configured such that the piston rod gasket 11 can rest on a contact surface 22 and can be radially fixed by a centering surface 49. This configuration can provide a common reference plane for the piston rod gasket 11 and the bearing bush 15, so that errors resulting from axial misalignment can be minimized.

The graduated base body of the piston rod guide 17 can form the damping medium sump 25, which can preferably be connected to the equalization chamber 7 by means of at least one reflux opening 27. To minimize the amount of space occupied by the unit, each reflux opening 27 can be pressed into the contact surface 22. Thus, an underside of the piston rod gasket 11, together with the contact surface 22, can thereby form the entrance into the reflux opening 27. As shown in FIG. 3, the outwardly disposed portion, or end of the reflux opening 27, in this embodiment, preferably ends at a bending radius of the guide 17, or in other words an area which is a transition from a horizontal segment of guide 17 to a vertical segment of guide 17. Thus, in contrast to known arrangements, no axial length of the piston rod guide 17 would generally be required for the reflux opening 27.

Except for the individual bending radii, all the surfaces of the piston rod guide 17 can serve a specified function, so that overall, the embodiment of the present invention can provide an essentially optimal utilization of space.

Figure 4:
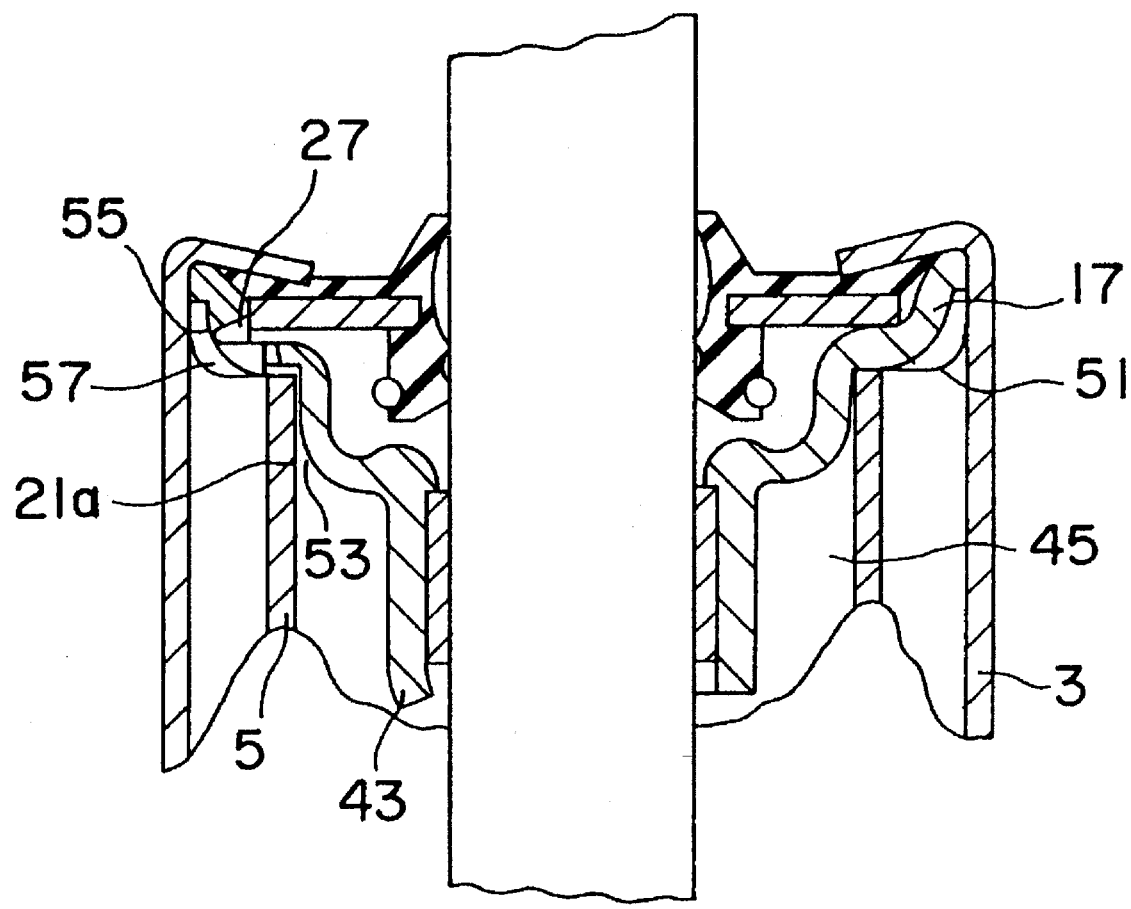
FIG. 4 illustrates the piston rod guide with a ventilation thrust collar.

FIG. 4 illustrates a variant of FIG. 3, which shows that an additional ventilation thrust collar 51 can also be installed about the upper end of the cylinder 5. The ventilation thrust collar 51, together with the piston rod guide 17, in the exit area of the reflux openings 27, and the inside wall of the sealed cylindrical tube 3 forms a type of syphon, which effectively prevents foaming upon dispersal of the damping medium from sump 27 back into the equalization chamber 7.

During operational usage of the shock absorber 1, air can possibly accumulate in the toroidal space 45. Therefore, the guide surface 21a can preferably be provided with at least one ventilation passage 53, which can empty into outlet notches 55. The ventilation passage 53 can preferably be formed by a number of crimps, beads, or flanges or depressions in the surface 21a of the guide 17. Alternatively, the passage 53 can be formed by configuring the guide surfaces 21a to have a conical shape. The outlet notches 55 can also preferably be formed by beads, crimps or depressions in either the surface 21b of the piston rod guide 17, or in the ventilation thrust collar 51.

During operation of the shock absorber, any accumulated air can thus be discharged via the ventilation passage 53 and the outlet notches 55 into a thrust collar chamber 57. The thrust collar chamber 57 will typically always be filled with damping medium, and, as such, an air-damping medium, (air-oil) mixture can be discharged into the equalization chamber 7 in a controlled manner. If the level of the damping medium exceeds the height of the ventilation thrust collar 51, then the damping medium can preferably run between the upper lip of the thrust collar 51 and inside wall of cylinder tube 3, then along the inside wall of the sealed cylinder tube 3 back into the equalization chamber 7.

One feature of the invention resides broadly in the one-piece sheet metal piston rod guide, in particular for a shock absorber, which consists of, among other things, a sealed cylindrical tube and a pressure tube filled with damping medium, whereby an equalization chamber is formed between the sealed cylindrical tube and the pressure tube, whereby moreover a piston rod gasket closes the shock absorber from the atmosphere, and comprises a graduated, circular, pot-shaped base body with a concentric guide surface for a bearing bush, a contact surface for the piston rod gasket and a guide surface in relation to the sealed cylindrical tube, and at least one reflux opening which is connected to the equalization chamber, characterized by the fact that the outside diameter of the piston rod guide 17 and the inside diameter of the sealed cylindrical tube 3, starting from the reflux opening(s) 27, form radial, narrow smoothing passages 29 to the equalization chamber 7, which take advantage of the adhesive forces to allow the damping medium to run down along the inside wall of the sealed cylindrical tube 3.

Another feature of the invention resides broadly in the sheet metal piston rod guide characterized by the fact that the guide surface 23 consists of segment-like guide sections 23a, between which the smoothing passages 29 run.

Yet another feature of the invention resides broadly in the sheet metal piston rod guide characterized by the fact that the reflux openings 27 are located immediately underneath the piston rod guide 11.

Still another feature of the invention resides broadly in the sheet metal piston rod guide characterized by the fact that the contact surface 22 for the piston rod gasket 11 is formed by the cross section surface.

A further feature of the invention resides broadly in the sheet metal piston rod guide characterized by the fact that the reflux openings 27 are made by notches in the vicinity of the contact surface 22 for the piston rod gasket 11.

Another feature of the invention resides broadly in the sheet metal piston rod guide characterized by the fact that the reflux openings are oriented essentially horizontally.

Yet another feature of the invention resides broadly in the sheet metal piston rod guide characterized by the fact that the distance (a) between the contact surfaces 21b; 22 for the piston rod and the pressure tube is greater than the distance (b) between the graduation and the base 31 of the piston rod guide.

Still another feature of the invention resides broadly in the sheet metal piston rod guide characterized by the fact that at least the side of the reflux opening(s) 27 facing the piston rod 13 is embossed into the contact surface 22 for the piston rod gasket 11, so that on a longitudinal segment the reflux opening(s) 27 is/are formed by the underside of the piston rod gasket 11 and the embossing(s) in the contact surface 22 of the piston rod guide 17.

A further feature of the invention resides broadly in the sheet metal piston rod guide characterized by the fact that the piston rod guide 17 has a centering surface 49 for the piston rod gasket 11, whereby the centering surface 49 is a component of the graduation of the piston rod guide 17.

Another feature of the invention resides broadly in the sheet metal piston rod guide characterized by the fact that the guide surface 19 for the bearing bush 5 forms a transition fit with the bearing bush 5, and the bearing bush 5 is axially fixed in position by multiple hammered bends 43 of the piston rod guide 17 between the stop surface(s) 41.

Yet another feature of the invention resides broadly in the sheet metal piston rod guide characterized by the fact that the flange 35 and the pressure tube 5 define an annular space 45, in which there is a decompression stop pad 47.

Still another feature of the invention resides broadly in the sheet metal piston rod guide characterized by the fact that the guide surface 21a forms at least one ventilation passage 53, which is in communication with outlet notches 55, which empty into a thrust collar chamber 57 defined by a ventilation thrust collar 51.

A further feature of the invention resides broadly in the sheet metal piston rod guide characterized by the fact that the guide surface 21a has a conical shape.

Some additional types of shock absorbers, and piston rod guide elements which could possibly utilize the guide arrangement in accordance with the present invention, are disclosed by the following U.S. patents U.S. Pat. No. 4,480,730 to Koller et al. entitled "*Shock Absorber Unit for Vehicles*"; U.S. Pat. No. 4,375,843 to Itzinger et al., entitled "*Piston-Cylinder Assembly for a Vibration Damper Unit Having an Essentially Tubular Container*"; U.S. Pat. No. 4,270,635 to Felix Wössner, entitled "*Shock Absorber for Vehicles*"; and U.S. Pat. No. 4,238,009 to Felix Wössner and Handke Günther, entitled "*Vibration Damper for Motor Vehicles*".

One additional example of a thrust collar as used in a shock absorber is disclosed in U.S. Pat. No. 4,083,437 to Erhard Leppich, entitled "*Shock Absorber Valve*", which could possibly be incorporated into the present invention. In addition the phenomenon of foaming in shock absorbers is further addressed in the following U.S. Pat. Nos.: 4,673,068 to Alexis DeBruijn, entitled "*Hydraulic Twin-Pipe Shock Absorber*"; and 3,931,961 to Fader et al., entitled "*Shock Absorber*".

All, or substantially all, of the components and methods of the various embodiments may be used with at least one embodiment or all of the embodiments, if any, described herein.

All of the patents, patent applications and publications recited herein, are hereby incorporated by reference as if set forth in their entirety herein wherein United States patents are incorporable for essential material, and any foreign references or additional english language references are incorporable for non-essential, background information.

The corresponding foreign patent publication applications, namely, Federal Republic of Germany Patent Application No. P 43 11 101, filed on Apr. 3, 1993, and No. P 43 11 100, filed on Apr. 3, 1993, having inventors Hubert Beck, Andreas Förster, including DE-OS 43 11 101, DE-PS 43 11 101, DE-OS 43 11 100 and DE-PS 43 11 100, as well as their published equivalents, are hereby incorporated by reference as if set forth in their entirety herein.

The details in the patents, patent applications and publications incorporated herein by reference, form part of the specification and are incorporable into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber, said shock absorber having a longitudinal axis, said longitudinal axis defining a longitudinal dimension, said shock absorber comprising:

a first tubular member, said first tubular member having a first end and a second end;

a second tubular member disposed within said first tubular member, said second tubular member having a first end disposed adjacent the first end of said first tubular member, and said second tubular member comprising a chamber therewithin;

said first tubular member and said second tubular member defining an annular space therebetween, said first tubular member and said second tubular member each having a wall disposed towards the annular space, and each wall having a wall surface disposed towards said annular space;

piston means disposed within said second tubular member, said piston means dividing said chamber of said second tubular member into a first chamber portion and a second chamber portion;

piston rod means disposed through said first end of each of said first and second tubular members, said piston rod means being movable axially within said second tubular member in a direction along the longitudinal dimension of the shock absorber;

said piston rod means being connected to said piston means for movement of said piston means along with said piston rod means;

damping fluid disposed within said second tubular member and said annular space, said damping fluid having a viscosity and said damping fluid and said wall surfaces of said first and second tubular members having a cohesion therebetween;

said annular space further comprising a gas space having a gas therein, said damping fluid in said annular space having a fluid surface disposed adjacent the gas in said annular space;

said first end of said first and second tubular members comprising guide means for guiding said piston rod means during said axial movement of said piston rod means;

said guide means comprising means for at least partially closing said first end of said second tubular member, said means for partially closing defining a space adjacent the first end of said second tubular member, and said means for at least partially closing comprising a guide surface disposed about said piston rod means;

said guide means comprises passage means for conveying damping fluid from said space adjacent the first end of said second tubular member to said annular space between said first and second tubular members;

at least one of said wall surfaces of said first and second tubular members extending from said passage means to said fluid surface in said annular space for conveyance of the damping fluid passing through said passage means to said fluid surface;

said passage means comprising means for conveying substantially all of the damping fluid passing through said passage means, from the space adjacent the first end of said second tubular member, to said at least one of said wall surfaces of said first and second tubular members;

said means for conveying substantially all of the damping fluid passing through said passage means to said at least one of said wall surfaces comprising a first passage portion of said passage means, said first passage portion being disposed substantially adjacent said at least one of said wall surfaces to lead the damping fluid passing through said passage means onto said at least one of said wall surfaces and into cohesion with said at least one of said wall surfaces for conveyance of the damping fluid along said at least one of said wall surfaces to said fluid surface;

said first passage portion having a longitudinal dimension along said first passage portion and a cross-section transverse to said longitudinal dimension; and said cross-section of said first passage portion being dimensioned in relation to said viscosity of the damping fluid to lead the damping fluid, passing through said passage means, onto said at least one wall surface, so that substantially all of the damping fluid passing through said passage means flows along said at least one of said wall surfaces and remains in flowing contact with said at least one of said wall surfaces, and further flows through said gas spacer and yet further flows to said fluid surface in said annular space.

2. The shock absorber according to claim 1, wherein:

said guide means further comprises gasket means for sealing said first end of said first tubular member from the surrounding environment;

the space adjacent the first end of said second tubular member comprises a space between said gasket means and said means for at least partially closing said second tubular member;

said means for at least partially closing comprises a first circumferential surface portion, said first circumferential surface portion having an outside diameter;

said wall surface of said first tubular member has an inside diameter; and said means for at least partially closing said second tubular member is disposed within the first end of said first tubular member with said first circumferential surface thereof adjacent said wall surface of said first tubular member; and said first passage portion is formed between said wall surface of said first tubular member and said first circumferential surface of said guide means to permit substantially all of the damping fluid passing through said passage means to flow onto said wall surface of said first tubular member for conveyance of substantially all of the damping fluid passing through said passage means along said wall surface of said first tubular member.

3. The shock absorber according to claim 2, wherein:

said wall surface of said first tubular member is cylindrical and of a substantially constant radius from said passage means to said fluid surface in said annular space to prevent dripping of damping fluid from said wall surface during conveying of damping fluid along said wall surface;

said means for at least partially closing comprises a first cylindrical wall part, said first cylindrical wall part comprising said first circumferential surface portion, said first cylindrical wall part comprises an edge portion in contact with said gasket means, and said gasket means comprises a surface portion in contact with said edge portion of said first cylindrical wall part;

said passage means comprises a second passage portion in communication with said first passage portion, said second passage portion being disposed substantially radially to said piston rod means;

at least a substantial portion of said second passage portion comprising a radially disposed impression into one of:

the contact surface of said gasket means; and the edge portion of said first cylindrical wall part, to form said at least a substantial portion of the length of said second passage portion between the contacting surfaces of said gasket means and said edge portion; and said first and second passage portions comprise unobstructed passage portions for permitting unobstructed flow of damping fluid therethrough.

4. The shock absorber according to claim 3, wherein:

said first circumferential surface comprises a guide surface for guiding placement of said means for at least partially closing within said first tubular member;

said guide means comprises at least two of said passage means with corresponding first and second passage portions; and said second passage portions are disposed spaced apart about the first circumferential surface, and said second passage portions divide said guide surface of said first circumferential surface into guide segment portions; and said first passage portions comprise recesses impressed into said first circumferential surface.

5. The shock absorber according to claim 4, wherein:

said second passage portions comprise a notch in said edge portion of said first cylindrical wall part, said notch being disposed immediately adjacent said contact surface of said gasket means;

said means for at least partially closing comprises a one-piece sheet metal member for being disposed within the first end of said first tubular member;

said means for at least partially closing comprises a second cylindrical wall part disposed about said piston rod means, said second cylindrical wall part comprising a second surface portion disposed circumferentially about said piston rod means; and said guide means further comprises a bearing bush disposed between said second surface and said piston rod means, and said bearing bush comprises said guide surface.

6. The shock absorber according to claim 5, wherein:

the longitudinal dimension of said shock absorber is for being disposed substantially vertically, with said first ends of said first and second tubular members disposed upwardly;

said second passage portions comprises substantially horizontal passage portions in said substantially vertical shock absorber;

said means for at least partially closing comprises a substantially annular member, said annular member having, extending radially from said longitudinal axis, a substantially U-shaped cross-section in a plane parallel to and through said longitudinal axis, said annular member having first and second upwardly protruding flange means and base means disposed between and interconnecting said first and second flange means, said first upwardly protruding flange means comprising said first cylindrical wall part and said second upwardly protruding flange means comprising said second surface about said piston rod means;

said edge portion comprises a cross-sectional dimension of said first flange means;

said gasket means comprises a disk-shaped member having a central opening therein for receiving said piston rod means therein, said contact surface of said gasket means comprises a peripheral edge of said disk-shaped member;

said space between said means for at least partially closing and said gasket means comprises a damping fluid sump;

said base of said means for partially closing comprises a stepped portion having a first height; and said first flange means has a second height to said stepped portion, and the first height is substantially less than the second height.

7. The shock absorber according to claim 6, wherein:

said first circumferential surface has a circumference;

said at least two passage means comprise four passage means each having corresponding first and second passage portions;

said first passage portions have a width of about $1/9$th to about $1/11$th of the circumference of said first circumferential surface;

said first passage portions have a depth of about 1 mm impressed into said first circumferential surface, said thickness being configured to substantially prohibit gas from the gas space from flowing through said first passage portions when damping fluid is flowing through said first passage portions;

said first height is about $1/8$th to about $1/12$th of said second height;

said annular space in said substantially vertical position of said shock absorber comprises said gas space adjacent said first end of said first tubular member with said damping fluid therebelow;

said first passage portions are configured for conveying substantially all of the damping fluid passing through said passage means, solely along the wall of said first tubular member, through the gas space and to the surface of said damping fluid within the annular space;

said stepped portion of said base defines a third cylindrical wall part, said third cylindrical wall part being disposed concentrically with said first and second cylindrical wall parts about said piston rod means;

said third cylindrical wall part being configured for receiving the first end of said second tubular member therearound to fix the first end of said second tubular member with respect to the first end of said first tubular member;

said gasket means further comprises an elastomeric member disposed within said opening of said disk-shaped member, said elastomeric member comprising a cylindrical member for being disposed about and sealing around said piston rod means disposed through said opening;

said elastomeric member having a first end disposed within damping fluid in said sump to lubricate said elastomeric member and prevent air from escaping adjacent thereto into the surrounding environment;

said first end of said elastomeric member comprising ring means disposed thereabout for retaining said first end of said elastomeric member in engagement with said piston rod means;

said base portion has a resiliency with respect to said first flange means, said resiliency being in the longitudinal direction of said shock absorber to prestress said second tubular member in a direction away from said first end of said first tubular member; and said shock absorber further comprises:

a third tubular member disposed between said first and second tubular member, said third tubular member being disposed about at least a portion of said second tubular member to define a fluid passage between said first and third tubular members, said fluid passage comprising a first opening in said second tubular member in fluid connection with said first chamber portion;

a second opening between said second chamber portion and said annular space; and control valve means disposed to open and close said fluid passage between said first and third tubular members, to control flow of damping fluid between said first and second chamber portions via said first opening, said fluid passage, said annular space and said second opening.

8. A method for making and operating a shock absorber to substantially reduce foaming of damping fluid within the shock absorber, the shock absorber having a longitudinal axis, said longitudinal axis defining a longitudinal dimension, and the shock absorber comprising: a first tubular member, the first tubular member having a first end and a second end; a second tubular member disposed within the first tubular member, the second tubular member having a first end disposed adjacent the first end of the first tubular member, and the second tubular member comprising a chamber therewithin; the first tubular member and the second tubular member defining an annular space therebetween, the first tubular member and the second tubular member each having a wall disposed towards the annular space, and each wall having a wall surface disposed towards said annular space; piston means disposed within the second tubular member, the piston means dividing the chamber of the second tubular member into a first chamber portion and a second chamber portion; piston rod means disposed through the first end of each of the first and second tubular members, the piston rod means being movable axially within the second tubular member in a direction along the longitudinal dimension of the shock absorber; the piston rod means being connected to the piston means for movement of the piston means along with the piston rod means; damping fluid disposed within the second tubular member and the annular space, said damping fluid having a viscosity, and said damping fluid and said wall surfaces of said first and second tubular members having a cohesion therebetween; the annular space further comprising a gas space having a gas therein, said damping fluid in said annular space having a fluid surface disposed adjacent the gas in said annular space; the first end of the first and second tubular members comprising guide means for guiding the piston rod means during the axial movement of the piston rod means; the guide means comprising means for at least partially closing the first end of the second tubular member, the means for at least partially closing defining a space adjacent the first end of the second tubular member, and the means for at least partially closing comprising a guide surface disposed about the piston rod means; the guide means comprises passage means for conveying damping fluid from the space adjacent the first end of the second tubular member to the annular space between the first and second tubular members; at least one of said wall surfaces of said first and second tubular members extending from said passage means to said fluid surface in said annular space for conveyance of the damping fluid passing through said passage means to said fluid surface; and the passage means comprising means for conveying substantially all of the damping fluid passing through the passage means, from the space adjacent the first end of the second tubular member, to said at least one of said wall surfaces of at least one of the first and second tubular members; the means for conveying comprising a first passage portion of the passage means, the first passage portion being disposed substantially adjacent the at least one of the wall surfaces to lead the damping fluid passing through the passage means onto the at least one of the wall surfaces and into cohesion with the at least one of the wall surfaces for conveyance of the damping fluid along the at least one of the wall surfaces to said fluid surface; the first passage portion having a longitudinal dimension along the first passage portion and a cross-section transverse to the longitudinal dimension; and the cross-section of the first passage portion being dimensioned in relation to the viscosity of the damping fluid for dispersing the damping fluid, passing through the passage means, onto the at least one of the wall surfaces, and said method comprising the steps of:

providing the first tubular member;

providing the second tubular member within the first tubular member to form the annular space between the first tubular member and the second tubular member;

providing the piston means and the piston rod means within the second tubular member with the piston rod means extending out of the first end of the second tubular member;

providing the damping fluid within the second tubular member and within the annular space, to a level within the annular space to provide the gas space above the damping fluid;

placing the piston rod guide means adjacent the first end of the first and second tubular members with the guide surface of the means for at least partially closing disposed about the piston rod means;

providing the means for at least partially closing;

providing the passage means in the means for at least partially closing;

configuring the first passage portion for dispersing damping fluid passing through the passage means onto the at least one of the wall surfaces;

at least partially closing the first end of the second tubular member with the means for at least partially closing;

operating the shock absorber by moving the piston rod within the guide surface of the means for at least partially closing;

conveying damping fluid through the means for at least partially closing, along the guide surface during said moving of the piston rod within the guide surface;

providing said passage means for conveying the damping fluid back to the annular space;

conveying damping fluid through said passage means;

conveying substantially all of the damping fluid passing through said passage means through said first passage portion and onto the at least one of the wall surfaces;

conveying substantially all of the damping fluid, passing through said passage means, along the at least one of the wall surfaces and in contact with the at least one of the wall surfaces from said passage means to the fluid surface; and substantially reducing foaming of the damping fluid within the annular space by said conveying of the substantial portion of the damping fluid along the at least one of the wall surfaces.

9. The method according to claim 8, wherein said guide means further comprises gasket means for sealing said first end of said first tubular member from the surrounding environment; the space adjacent the first end of said second tubular member comprises a space between said gasket means and said means for at least partially closing said second tubular member; said means for at least partially closing comprises a first circumferential surface portion, said first circumferential surface portion having an outside diameter; said wall surface of said first tubular member has an inside diameter; said means for at least partially closing said second tubular member is disposed within the first end of said first tubular member with said first circumferential surface thereof adjacent said wall surface of said first tubular member; and said first passage portion being formed between said wall surface of said first tubular member and said first circumferential surface of said guide means to convey substantially all of the damping fluid along the wall surface of said first tubular member; said wall surface of said first tubular member being configured for fluidly conveying the damping fluid, passing through said passage means, along said wall surface of said first tubular member, from said passage means to said damping fluid surface in said annular space and said method further comprises the steps of:

disposing said means for at least partially closing within the first end of said first tubular member with said first circumferential surface thereof adjacent said wall surface of said first tubular member to form said first passage portion between said first circumferential surface and said wall of said first tubular member; and conveying substantially all of the damping fluid passing through said passage means, from the space adjacent the first end of said second tubular member, through said first passage portion between said first circumferential surface and said wall surface of said first tubular member, and along the wall surface of said first tubular member to substantially reduce foaming of damping fluid in the annular space.

10. The method according to claim 9, wherein: said cross-section of said first passage portion is configured to substantially prohibit gas from the gas space from flowing through the first passage portion when damping fluid is present within the first passage portion; said means for at least partially closing comprises a first cylindrical wall part, said first cylindrical wall part comprising said first circumferential surface, said first cylindrical wall part comprises an edge portion in contact with said gasket means, and said gasket means comprises a surface portion in contact with said edge portion of said first cylindrical wall part; said passage means comprises a second passage portion in communication with said first passage portion, said second passage portion being disposed substantially radially to said piston rod means; and at least a substantial portion of said second passage portion comprising a radially disposed recess impressed into one of:

the contact surface of said gasket means; and the edge portion of said first cylindrical wall part, to form said at least a substantial portion of the length of said second passage portion between the contacting surfaces of said gasket means and said edge portion; said method further comprising the steps of:

forming a radially disposed recess by impression into one of:
the contact surface of said gasket means; and
the edge portion of said first cylindrical wall part, to form said at least a substantial portion of the length of said second passage portion;

conveying substantially all of the damping fluid passing through said passage means, from the space adjacent the first end of said second tubular member, through said second radial passage portion, through said first passage portion, and along the wall surface of said first tubular member to substantially reduce foaming of damping fluid in the annular space; and blocking flow of gas into said first passage portion from the annular space with said damping fluid present in said first passage portion.

11. The method according to claim 10, wherein: said first circumferential surface comprises a guide surface for guiding placement of said means for at least partially closing within said first tubular member; said guide means comprises at least two said passage means with corresponding first and second passage portions; said second passage portions are disposed spaced apart about the first circumferential surface, and said second passage portions divide said guide surface of said first circumferential surface into guide segment portions; said first passage portions comprise impressions into said first circumferential surface; and said method further comprises the steps of:

providing at least two of said passage means by forming at least two of said impressions into said first cylindrical guide surface; and conveying a very substantial portion of the damping fluid passing through said passage means, along the wall of said first tubular member to substantially reduce foaming of damping fluid in the annular space.

12. The method according to claim 11, wherein said method further comprises configuring said shock absorber such that: said second passage portions comprise a notch in said edge portion of said first cylindrical wall part, said notch being disposed immediately adjacent said contact surface of said gasket means; said means for at least partially closing comprises a one-piece sheet metal member for being disposed within the first end of said first tubular member; said means for at least partially closing comprises a second cylindrical wall part disposed about said piston rod means, said second cylindrical wall part comprises a second surface portion disposed circumferentially about said piston rod means; and said guide means further comprises a bearing bush disposed between said second surface and said piston rod means, and said bearing bush comprises said guide surface; and said method further comprises the steps of:

carrying damping fluid from said chamber of said second cylinder through said means for at least partially closing along said bearing bush during movement of the piston rod means within the bearing bush.

13. The method according to claim 12, further comprising the steps of configuring said shock absorber such that:

the longitudinal dimension of said shock absorber is for being disposed substantially vertically, with said first ends of said first and second tubular members disposed upwardly;

said second passage portions comprises a substantially horizontal passage portions in said substantially vertical shock absorber;

said means for at least partially closing comprises a substantially annular member, said annular member having, extending radially from said longitudinal axis, a substantially U-shaped cross-section in a plane parallel to and through said longitudinal axis, said annular member having first and second upwardly protruding flange means and base means disposed between and interconnecting said first and second flange means, said first upwardly protruding flange means comprising said first cylindrical wall part and said second upwardly protruding flange means comprising said second surface about said piston rod means;

said edge portion comprises a cross-sectional dimension of said first flange means;

said gasket means as a disk-shaped member having a central opening therein for receiving said piston rod means therein, said contact surface of said gasket means comprises a peripheral edge of said disk-shaped member;

said space between said means for at least partially closing and said gasket means comprises a damping fluid sump;

said base of said means for at least partially closing comprises a stepped portion having a first height;

said first flange means has a second height to said stepped portion, with the first height being substantially less than the second height;

said first circumferential surface has a circumference;

said at least two passage means comprise four passage means each having corresponding first and second passage portions;

said first passage portions have a width of about 1/9th to about 1/11th of the circumference of said first circumferential surface;

said first passage portions have a depth of about 1 mm impressed into said first circumferential surface, said thickness being configured to substantially prohibit gas from the gas space from flowing through said first passage portions when damping fluid is flowing through said first passage portions;

said first height is about 1/8th to about 1/12th of said second height;

said annular space in said substantially vertical position of said shock absorber comprises said gas space adjacent said first end of said first tubular member with said damping fluid therebelow;

said first passage portions are configured for conveying substantially all of the damping fluid passing through said passage means, solely along the wall of said first tubular member, through the gas space and to the surface of said damping fluid within the annular space;

said stepped portion of said base defines a third cylindrical wall part, said third cylindrical wall part being disposed concentrically with said first and second cylindrical wall parts about said piston rod means;

said third cylindrical wall part being configured for receiving the first end of said second tubular member therearound to fix the first end of said second tubular member with respect to the first end of said first tubular member;

said gasket means further comprises an elastomeric member disposed within said opening of said disk-shaped member, said elastomeric member comprising a cylindrical member for being disposed about and sealing around said piston rod means disposed through said opening;

said elastomeric member having a first end disposed within damping fluid in said sump to lubricate said elastomeric member;

said first end of said elastomeric member comprising ring means disposed thereabout for retaining said first end of said elastomeric member in engagement with said piston rod means;

said base portion has a resiliency with respect to said first flange means, said resiliency being in the longitudinal direction of said shock absorber to prestress said second tubular member in a direction away from said first end of said first tubular member; and said shock absorber further comprises:
a third tubular member disposed between said first and second tubular member; said third tubular member being disposed about at least a portion of said second tubular member to define a fluid passage between said first and third tubular members, said fluid passage comprising a first opening in said second tubular member in fluid connection with said first chamber portion;
a second opening between said second chamber portion and said annular space; and
control valve means disposed to open and close said fluid passage between said first and third tubular members, to control flow of damping fluid between said first and second chamber portions via said first opening, said fluid passage, said annular space and said second opening; and said method further comprises conveying substantially all of the damping fluid passing through said passage means, solely along the wall of said first tubular member, through the gas space and to the surface of said damping fluid within the annular space.

14. A shock absorber, said shock absorber having a longitudinal dimension, said shock absorber comprising:

a first tubular member, said first tubular member having a first end and a second end;

a second tubular member disposed within said first tubular member, said second tubular member having a first end disposed adjacent the first end of said first tubular member, and said second tubular member comprising a chamber therewithin;

said first tubular member and said second tubular member defining an annular space therebetween, said first tubular member and said second tubular member each having a wall disposed towards the annular space, each said wall having a surface disposed towards said annular space;

piston means disposed within said second tubular member, said piston means dividing said chamber of said second tubular member into a first chamber portion and a second chamber portion;

piston rod means disposed through said first end of each of said first and second tubular members, said piston rod means being movable axially within said second tubular member in a direction along the longitudinal dimension of the shock absorber;

said piston rod means being connected to said piston means for movement of said piston means along with said piston rod means;

damping fluid disposed within said second tubular member and said annular space;

said annular space further comprising a gas space having a gas therein, said damping fluid in said annular space having a surface disposed adjacent the gas in said annular space;

said first end of said first and second tubular members comprising guide means for guiding said piston rod means during said axial movement of said piston rod means;

said guide means comprising:
means for at least partially closing said first end of said second tubular member;
gasket means for sealing the first end of said first tubular member from the environment, said means for at least partially closing defining a space between said gasket means and the first end of said second tubular member, and said means for at least partially closing comprising a guide surface disposed about said piston rod means for guiding movement of the piston rod therein;
passage means for conveying damping fluid from the space between the gasket means and the first end of said second tubular member, to said annular space between said first and second tubular members;

at least one of said wall surfaces extending from said passage means to said fluid surface;

said passage means comprising a first passage portion disposed adjacent said surface of said at least one of said first tubular member and said second tubular member to lead the damping fluid, passing through said passage means, onto said at least one of said wall surfaces and into cohesion with said at least one of said wall surfaces, for conveyance of the damping fluid along said at least one of said wall surfaces, from said passage means, through said gas space, and to said damping fluid surface in said annular space;

said at least one of said wall surfaces being configured for preventing dripping of damping fluid from said at least one of said wall surfaces during conveying of damping fluid along said at least one of said wall surfaces;

said means for at least partially closing and said gasket means each comprising a substantial surface in contact with a substantial surface of the other of said means for at least partially closing and said gasket means;

said passage means comprises a second passage portion having a length disposed substantially radially to said piston rod means;

at least a substantial portion of the length of said second passage portion comprising a radially disposed impression into one of:
the contact surface of said gasket means; and
the contact surface of said means for at least partially closing, to form said at least a substantial portion of the length of said second passage portion between the contacting surfaces of said gasket means and said means for at least partially closing.

16. The shock absrober according to claim 15, wherein:

said means for at least partially closing comprises a bend between said first annular surface and said second cylindrical surface;

said passage means comprises a second passage portion in communication with said first passage portion, said second passage portion being disposed through said means for at least partially closing in the vicinity of said bend;

said means for at least partially closing comprises a first cylindrical wall part disposed about said piston rod means, said first cylindrical wall part comprising a surface portion disposed circumferentially about said piston rod means;

said guide means further comprises a bearing bush disposed between said surface portion of said first cylindrical wall part and said piston rod means, and said bearing bush comprises said guide surface;

said bearing bush is configured to fit loosely within said surface portion of said first cylindrical wall part; and said first cylindrical wall part comprises hammered edges deformed radially inwardly to maintain said bearing bush within said surface portion of said first cylindrical wall part.

17. The shock absorber according to claim 16, wherein:

said means for at least partially closing comprises a second, axially stepped graduation, disposed radially inwardly from said first stepped graduation, said second stepped graduation being stepped in a direction away from said first end of said first tubular member towards said second tubular member;

said second stepped graduation defines a third annular surface disposed towards said second tubular member, said third annular surface being disposed substantially perpendicular to the longitudinal axis of said shock absorber, and a fourth cylindrical surface concentric to said piston rod means, said fourth cylindrical surface being configured for being disposed within said first end of said second tubular member, with said first end of said second tubular member disposed in contact with said third annular surface;

said fourth surface and said third surface comprising a ventillation passage for venting gas out of said chamber of said second tubular member into said annular space; and said ventillation passage comprising an indentation in said third surface, and one of:

an indentation into said fourth surface; and a conical taper of said fourth surface, tapering away from said third surface towards said piston rod means.

18. The shock absorber according to claim 17, wherein:

said shock absorber further comprises a ventillation thrust collar disposed radially outwardly from the first end of said second tubular member to said first tubular member;

said thrust collar defining a chamber between said thrust collar and said bend of said means for partially closing, said thrust chamber being separated from said annular chamber by said thrust collar; and said ventillation passage is disposed from said chamber of said second tubular member to said thrust chamber to vent gas from said chamber of said second tubular member into said thrust chamber.

19. The shock absorber according to claim 18, wherein:

said first cylindrical wall part and said second cylindrical member are spaced apart from one another to define a space therebetween;

said second cylindrical member further comprises a decompression stop pad fixed thereto within the space between said first cylindrical wall part and said second cylindrical member;

said piston rod comprises flange means for engaging said decompression stop pad to limit movement of said piston rod out of said second tubular member;

said first circumferential surface of said means for at least partially closing comprises a guide surface for guiding placement of said means for at least partially closing within said first tubular member;

said first passage portion comprises impressions into said contact surface of said means for at least partially closing;

said means for at least partially closing comprises a one-piece sheet metal member for being disposed within the first end of said first tubular member;

the longitudinal dimension of said shock absorber is for being disposed substantially vertically, with said first ends of said first and second tubular members disposed upwardly;

said second passage portions comprises at least a first portion thereof disposed vertically adjacent said second tubular member, and a second portion thereof disposed substantially horizontally in said substantially vertical shock absorber;

said means for at least partially closing comprises a substantially bowl-shaped member having an orifice therein for receiving said piston rod means therethrough;

said bowl-shaped member having a base portion disposed substantially radially about said piston rod means, and said first cylindrical wall part extends away from said base portion in a direction away from said first end of said first cylindrical member;

said disk-shaped member of said gasket means comprises a central opening therein for receiving said piston rod means therethrough, said contact surface of said gasket means comprises a peripheral portion of said disk-shaped member; and said space between said means for at least partially closing and said gasket means comprises a damping fluid sump.

20. The shock absorber according to claim 19, wherein:

said annular space in said substantially vertical position of said shock absorber comprises said gas space adjacent said thrust collar in the first end of said first tubular member with said damping fluid therebelow;

the damping fluid in the annular space has a surface adjacent the gas space;

said thrust collar is configured for conveying substantially all of the damping fluid passing through said passage means, solely along the wall of said first tubular member, through the gas space and to the surface of said damping fluid within the annular space;

said gasket means further comprises an elastomeric member disposed within said opening of said disk-shaped member, said elastomeric member comprising a cylindrical member for being disposed about and sealing around said piston rod means disposed through said opening; said elastomeric member having a first end disposed within damping fluid in said sump to lubricate said elastomeric member; said first end of said elastomeric member comprising ring means disposed thereabout for retaining said first end of said elastomeric member in engagement with said piston rod means; and said shock absorber further comprises:

a third tubular member disposed between said first and second tubular member; said third tubular member being disposed about at least a portion of said second tubular member to define a fluid passage between said first and third tubular members, said fluid passage comprising a first opening in said second tubular member in fluid connection with said first chamber portion;

a second opening between said second chamber portion and said annular space; and control valve means disposed to open and close said fluid passage between said first and third tubular members, to control flow of damping fluid between said first and second chamber portions via said first opening, said fluid passage, said annular space and said second opening.

* * * * *

UNITED STATES PATENT AND TRADEMARK OFFICE
CERTIFICATE OF CORRECTION

PATENT NO. : 5,477,949

DATED : December 26, 1995

INVENTOR(S) : Andreas FÖRSTER and Hubert BECK

It is certified that error appears in the above-indentified patent and that said Letters Patent is hereby corrected as shown below:

```
    On the title page, item [56], under the
"FOREIGN PATENT DOCUMENTS" section, after the
0535409 reference, insert the following reference:
        --2426188  5/1978  France.--.

In column 14, line 6, Claim 1, after 'gas',
delete "spacer" and insert --space,--.
```

Signed and Sealed this

Twenty-fourth Day of December, 1996

Attest:

BRUCE LEHMAN

*Attesting Officer*      *Commissioner of Patents and Trademarks*